(12) United States Patent
Violleau et al.

(10) Patent No.: US 8,543,841 B2
(45) Date of Patent: Sep. 24, 2013

(54) SECURE HOSTED EXECUTION ARCHITECTURE

(75) Inventors: Thierry P. Violleau, Yvelines (FR); Tanjore S. Ravishankar, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 13/174,508

(22) Filed: Jun. 30, 2011

(65) Prior Publication Data

US 2013/0007470 A1    Jan. 3, 2013

(51) Int. Cl.
*G06F 11/30* (2006.01)
*H04L 9/32* (2006.01)

(52) U.S. Cl.
USPC ........... 713/193; 713/189; 713/190; 713/191; 713/194; 726/24; 726/25; 726/26

(58) Field of Classification Search
USPC ......................................................... 713/193
See application file for complete search history.

(56) References Cited

U.S. PATENT DOCUMENTS

| | | | |
|---|---|---|---|
| 6,954,754 B2 * | 10/2005 | Peng .................................. | 1/1 |
| 2002/0156863 A1 * | 10/2002 | Peng ........................... | 709/217 |
| 2009/0049510 A1 | 2/2009 | Zhang et al. | |
| 2010/0235647 A1 | 9/2010 | Buer | |

FOREIGN PATENT DOCUMENTS

| | | |
|---|---|---|
| EP | 2015212 A1 | 1/2009 |
| WO | 0208873 A1 | 1/2002 |
| WO | 2004003861 A1 | 1/2004 |

OTHER PUBLICATIONS

International Search Report from PCT/US2012/043201 dated Oct. 31, 2012 (5 pages).
Written Opinion from PCT/US2012/043204 dated Oct. 31, 2012 (10 pages).
Liang, Z. et al.; "Isolated Program Execution: An Application Transparent Approach for Executing Untrusted Programs";Proceedings of the 19th Annual Computer Security Applications Conference; Stony Brook University, Stony Brook, NY; 2003 (10 pages).

* cited by examiner

*Primary Examiner* — Longbit Chai
(74) *Attorney, Agent, or Firm* — Osha Liang LLP

(57) ABSTRACT

In general, in one aspect, the invention relates to a method for executing applications. The method includes accessing a secure storage element via a host device including a computer processor; executing, by the computer processor, a hosted execution runtime environment (HERE) on the host device; identifying a persistent memory image of the HERE within the secure storage element; executing, by the computer processor, an application using the HERE; and applying, based on executing the application, a first set of changes to the persistent memory image.

20 Claims, 5 Drawing Sheets

SECURE HOSTED EXECUTION ARCHITECTURE

BACKGROUND

As the capabilities of modern computing devices have grown to meet ever increasing requirements, designers struggle to adapt existing software platforms to entirely new applications. Such devices span a spectrum ranging from pure embedded and hybrid embedded systems to general purpose computer systems. Certain applications, such as medical devices, smartphones, netbooks, and laptop computers are designed to meet strict hardware and software compatibility requirements. Many of these applications require an ever-changing balance between compatibility and security considerations.

Existing software platforms can provide extensive security features when coupled with compatible hardware. For example, data encapsulation and cryptography are common features among mobile operating systems utilizing a secure microcontroller. Hardware components can also contribute to the security of a device when coupled with compatible software. However, the design and development costs associated with such specialized architecture can be substantial.

In addition to the cost considerations, security features can limit the functionality and/or efficiency of a device. At the same time, many of the embedded systems used in common electronic devices are being modified to incorporate more of the functionality of a general purpose computer. For example, Web 2.0-enabled smartphones and netbooks are expected to mimic the online experience provided by a desktop personal computer, without the associated security risks. As designers include greater openness and functionality in the design of these devices, they also increase the possibility of introducing vulnerabilities which can be exploited by malware, Trojans, viruses, and other exploits. As a result, designers are faced with the difficult task of balancing security considerations with those of cost and functionality.

SUMMARY

In general, in one aspect, the invention relates to a method for executing applications. The method includes accessing a secure storage element via a host device including a computer processor; executing, by the computer processor, a hosted execution runtime environment (HERE) on the host device; identifying a persistent memory image of the HERE within the secure storage element; executing, by the computer processor, an application using the HERE; and applying, based on executing the application, a first set of changes to the persistent memory image.

In general, in one aspect, the invention relates to a system for executing applications. The system includes a host device including a computer processor; a secure storage element operatively connected to the host device and configured to authenticate a user of the host device for access to the secure storage element; and a hosted execution runtime environment (HERE) executing on the computer processor and configured to: identify a persistent memory image of the HERE within the secure storage element; and execute an application, where a first set of changes are applied to the persistent memory image of the HERE based on executing the application.

In general, in one aspect, the invention relates to a non-transitory computer-readable storage medium storing instructions for executing applications. The instructions include functionality to: access a secure storage element via a host device; execute a hosted execution runtime environment (HERE) on the host device; identify a persistent memory image of the HERE within the secure storage element; execute an application using the HERE; and apply, based on executing the application, a first set of changes to the persistent memory image.

Other aspects of the invention will be apparent from the following description and the appended claims.

DETAILED DESCRIPTION

Figure 1:
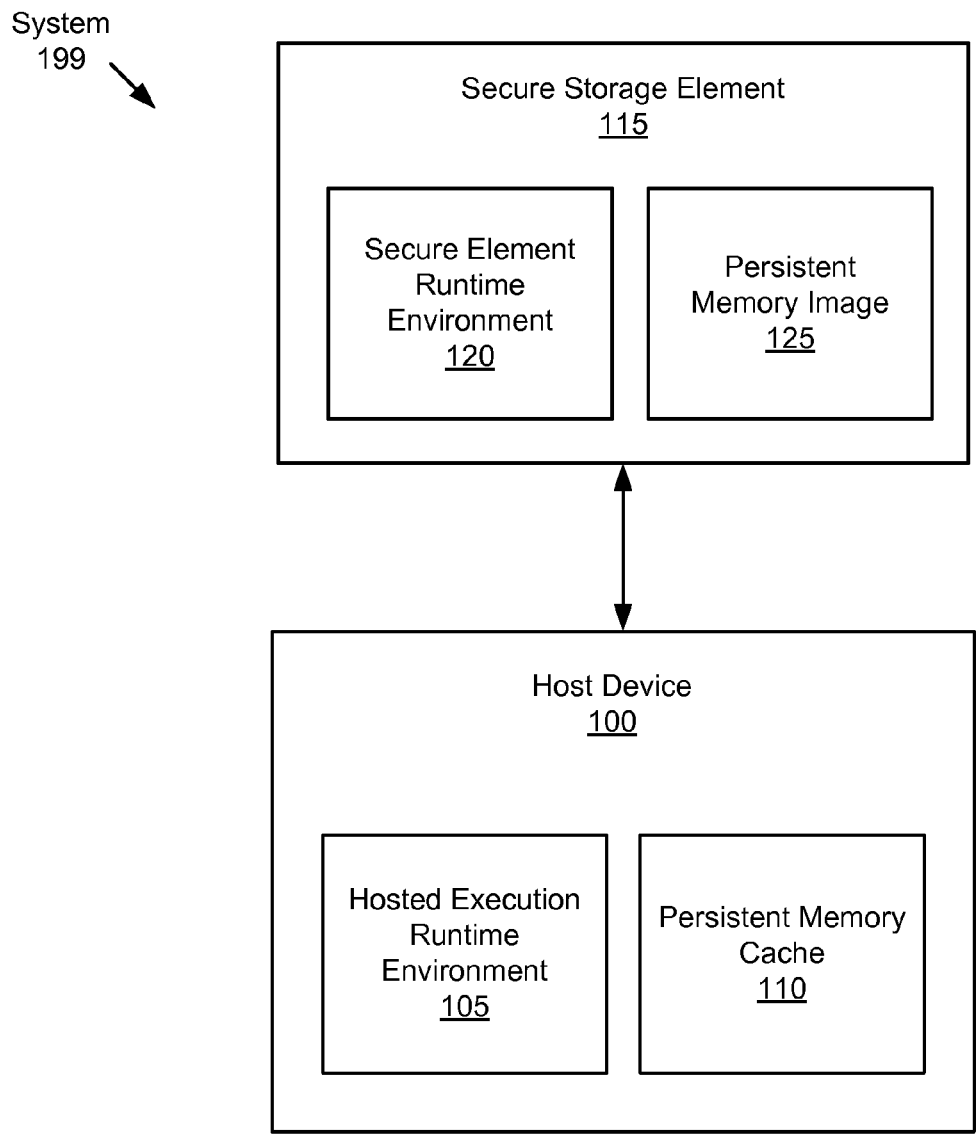
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for executing an application using a hosted execution runtime environment (HERE). In general, embodiments of the invention execute the HERE by a host device operatively connected to a secure storage element. The secure storage element includes a persistent memory image of the HERE, which may be updated as a result of executing the application.

FIG. 1 shows a system (199) in accordance with one embodiment of the invention. As shown in FIG. 1, the system (199) includes multiple components such as a host device (100), a hosted execution runtime environment (HERE) (105), a persistent memory cache (110), a secure storage element (115), a secure element runtime environment (SERE) (120), and a persistent memory image (125). The components of the system may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

The host device (100) may be a personal computer (PC), personal digital assistant (PDA), mobile phone, smartphone, mobile internet device (MID), ultra-mobile personal computer (UMPC), laptop, nettop, netbook, tablet, home theatre personal computer (HTPC), handheld computer, GPS navigation device, automobile computer system, a Mobile Information Device Profile (MIDP) compatible device, a Connected Limited Device Configuration (CLDC) compatible device, and/or any other computing device capable of executing an application.

In one or more embodiments of the invention, the secure storage element (115) is a memory device or an allocated segment of memory. Examples of a secure storage element (115) include a security token, subscriber identity module (SIM) card, a Secure Digital (SD) card, Ironkey™ USB card (Ironkey is a trademark of Ironkey Corporation, Sunnyvale, Calif.), a secure location within a trusted embedded environment (TEE), and any persistent memory capable of being read by the host device (100).

In one or more embodiments of the invention, the secure storage element (115) includes functionality to perform hardware data encryption and decryption, authentication, credential management, and/or access control. The secure storage element (115) may also include lockout functionality, biometric authentication, tamper resistant packaging/detection, and/or various other hardware and software security mechanisms in accordance with various embodiments of the invention.

In one or more embodiments of the invention, the secure storage element (115) includes a persistent memory image (125) of the HERE (105). The persistent memory image (125) may be any form of persistent memory (e.g., Electrically Erasable Programmable Read-Only Memory (EEPROM)) storing the HERE (105) within the secure storage element (115).

Continuing with the discussion of FIG. 1, the persistent memory cache (110) is a cache of the persistent memory image (125) residing on the host device (100) in accordance with one or more embodiments of the invention. The persistent memory cache (110) may reside on one or more persistent or non-persistent (i.e., volatile) memory devices (e.g., random access memory) within the host device (100) and/or operatively connected to the host device (100). In one or more embodiments of the invention, the SERE (120) is configured to transmit, over a secure communication session, a copy of the persistent memory image (125) to the HERE (105) to be used as the persistent memory cache (110).

The hosted execution runtime environment (HERE) (105) may be any software capable of executing applications on the host device (100). Examples of an HERE (105) may include Oracle Corporation's Java™ Runtime Environment (JRE), Oracle Corporation's Java Card™ Runtime Environment (JCRE), Nokia Corporation's Symbian operating system, Apple Corporation's iOS™, Google Corporation's Android operating system, and/or any operating system or runtime environment capable of executing an application.

In one or more embodiments of the invention, the HERE (105) is configured to create the persistent memory cache (110) at a predetermined time. For example, the persistent memory cache (110) may be created upon startup of the host device (100) or upon execution of the HERE (105) in the host device (100). The HERE (105) may be configured to create, synchronize, and/or delete the persistent memory cache (110) at any time, in accordance with various embodiments of the invention.

In one or more embodiments of the invention, the HERE (105) is configured to synchronize the persistent memory image (125) with the persistent memory cache (110). Synchronization may be performed to allow for the persistence of single item atomic changes and committed transactions on persistent objects. In one or more embodiments of the invention, single item atomic changes on persistent objects outside any transaction are immediately performed both on the persistent memory image (125) and the persistent memory cache (110).

In one or more embodiments of the invention, the HERE (105) maintains one or more change logs including changes to the persistent memory cache (110) which are not yet applied to the persistent memory image (125). Initially, changes within the scope of an on-going transaction may be performed on the persistent memory cache (110) and recorded in a change log. In one or more embodiments of the invention, when the transaction is committed, the change log is applied to the persistent memory image (125). The HERE (105) may maintain change logs per running application, per transaction, per session, and/or per update to the persistent memory cache (110), in accordance with one or more embodiments of the invention. In one or more embodiments of the invention, the SERE (120) stores the change log(s) within the secure storage element (115).

In one or more embodiments of the invention, the HERE (105) is configured to bypass a caching mechanism of the host device (100) in order to maintain the persistent memory cache (110) and to apply one or more of the methods of applying changes to the persistent memory image (125), as disclosed herein. In one or more embodiments of the invention, the HERE (105) is configured to utilize a caching mechanism of the host device (100) in order to force a synchronization of the persistent memory cache (110) with the persistent memory image (125).

Continuing with the discussion of FIG. 1, the HERE (105) is configured to detect a corruption and/or out-of-sync condition of the persistent memory image (125) in accordance with one or more embodiments of the invention. A corruption and/or out-of-sync condition may be caused by an interruption of the HERE (105), an interruption of the SERE (120), an interruption of an operating system of the host device (100), an abrupt removal of the secure storage element (115) by a user, and/or any interruption of a process or component associated with maintaining the integrity of the cache, cache log(s), session cache log(s), and or the persistent memory image (125). In one or more embodiments of the invention, the HERE (105) and/or the host device (100) are configured to perform a synchronization check upon startup. If, as a result of the synchronization check, a corruption and/or out-of-sync condition of the persistent memory image (125) is identified, the secure storage element (115) is blocked from further access until one or more predefined security verification and/or restoration processes can be performed.

In one or more embodiments of the invention, the HERE (105) is configured to roll back transactional changes that are partially applied to the persistent memory cache (110) and/or change log(s) in response to detecting an interruption. The HERE (105) may also be configured to recreate the persistent memory cache (110) when a corruption of the persistent memory cache (110) is detected. In one or more embodiments of the invention, the SERE (120) is configured to track synchronization operations for the persistent memory cache (110) and to verify that the last change log was properly recorded.

In one or more embodiments of the invention, the HERE (105) is configured to retrieve the last session change log from the secure storage element (115) and apply it upon the next platform reset. Alternatively, the SERE (120) may apply the change logs directly to the persistent memory image (125) concurrent with the execution of the HERE (105), in accordance with one or more embodiments of the invention.

In one or more embodiments of the invention, the HERE (105) includes one or more security features when coupled with the host device (100). Examples of security features include data encapsulation, application firewall, cryptography, and/or any other security feature provided by the HERE (105). In one or more embodiments of the invention, the host device (100) must meet a set of compatibility criteria in order to be deemed secure (i.e., guarantee the integrity of or support for one or more of the security features) by the HERE (105). Examples of compatibility criteria include hardware encryption support (e.g., program and/or data memory encryption, automatic generation of encryption keys), access prevention, copy/lock protection, embedded software security (e.g., firmware/memory security, trusted embedded environment (TEE) support, etc.), hardware component requirements, performance requirements (e.g., CPU, microcontroller, microprocessor benchmark requirements, random access memory (RAM), SRAM, ROM, EPROM, EEPROM, or other memory capacity requirements), memory addressing requirements, architectural design requirements (e.g., separate address and data buses), hardware/memory self destruct capability, tamper protection, separation of data and program memory, and etc.

Compatibility criteria may also include compliance with one or more standards defined by a standardization organization. Examples of a standard include JEDEC Standard 100B.01 and JESC21-C, which are maintained by the JEDEC Solid State Technology Association.

Continuing with the discussion of FIG. 1, the host device (100) does not meet one or more of the compatibility criteria of the HERE (105) in accordance with one or more embodiments of the invention In this way, the host device (100) may be considered non-secure with regard to one or more of the aforementioned security features. In other words, if the host device (100) is deemed non-secure, one or more of the security features may be potentially compromised or inoperable.

In one or more embodiments of the invention, the HERE (105) is configured to identify sensitive sections of an application. A sensitive section may be any segment of code, function, procedure, library, object, and/or other identifiable section of an application (including sections of the HERE (105) itself) either (1) demarcated as such or (2) matching a predefined criteria. Sensitive sections may be demarcated using a set of predefined annotations in the programming language in which the application was authored. For example, Java Card™ 3 Security Annotations may be used to demarcate sensitive sections of Java™ code. Java and Java Card are trademarks of Oracle Corporation, Redwood City, Calif. A sensitive section may be integrity sensitive, confidentiality sensitive, and/or sensitive according to any other predefined security criteria.

In one or more embodiments of the invention, the HERE (105) is configured to identify sensitive sections of an application based on a predefined criteria. The predefined criteria may identify any operation type, statement, and/or any criteria for identifying sections code (other than explicit demarcation, discussed above). For example, the HERE (105) may be configured to identify cryptographic computations as sensitive and to delegate them to the SERE (120) for execution. In one or more embodiments of the invention, the HERE (105) includes functionality to encrypt and store sensitive sections of an application in a memory device (e.g., RAM) of the host device (100). Encryption and decryption of the sensitive sections may thus be performed as required by an executing application.

In one or more embodiments of the invention, the HERE (105) includes functionality to generate remote proxies in order to allow the invocation of sensitive sections deployed on the secure storage element (115).

In one or more embodiments of the invention, the HERE (105) is configured to compute a check value of the HERE (105) code executing on the host device (100) and verify the check value against a previously computed check value. The check value may be stored on the host device (100) or the secure storage element (115) in accordance with various embodiments of the invention. If the check value is stored in the secure storage element (115), the check value may be transmitted over a secure communication session. In this way, the entire HERE (105) may be periodically verified.

In one or more embodiments of the invention, the HERE (105) is configured to periodically disconnect from the SERE (120) and to restart the host device (100) and/or to restart its own execution.

In one or more embodiments of the invention, the HERE (105) includes functionality to identify HERE-specific sections of an application and secure element specific (SE-specific) sections of an application. Both HERE-specific sections and SE-specific sections may be demarcated by developers of the application. In one or more embodiments of the invention, HERE-specific applications include web and Extended applet applications designed for execution by the HERE (105), while SE-specific applications include classic applets designed for execution by the SERE (120).

In one or more embodiments of the invention, the HERE (105) includes one or more security features that are compatible with HERE-specific sections (e.g., sections compatible with one or more security features of the HERE (105)) of an executing application. In one or more embodiments of the invention, the HERE (105) includes functionality to encrypt, decrypt, and/or transfer HERE-specific sections of an application to the SERE (120) to be stored as raw binary objects. The raw binary objects may then be passed back to the HERE (105) by the SERE (120) and decrypted by the HERE (105) during execution of the application. In one or more embodiments of the invention, the HERE (105) and the SERE (120) utilize an out-of-band communication protocol in order to transfer raw binary objects storing encrypted HERE-specific sections.

Continuing with the discussion of FIG. 1, the HERE (105) is configured to utilize remote proxies for applications originally designed for execution by the secure storage element (120), which are executing in the HERE (105) in accordance with one or more embodiments of the invention. These remote proxies may be used to delegate calls to the SERE (120) for security sensitive sections stored in the secure storage element (115). In one or more embodiments of the invention, developers may exploit remote to strengthen the security of applications originally designed for execution by the SERE (120), for execution by the HERE (105).

In one or more embodiments of the invention, the HERE (105) includes or is operatively connected to a hosted execution (HE) card manager. The HE card manager may include functionality to perform and/or facilitate communication between the HERE (105) and the secure storage element (115) and/or the SERE (120). Thus, the HE card manager may be configured to establish the secure communication session, handle credential management, perform cryptographic computations, and/or initiate one or more functions of the secure storage element (115) or a component thereof. In one or more embodiments of the invention, HERE-specific applications or sections of an application are delegated to the HE card manager for access (i.e., reading and writing) to the secure storage element (115). In one or more embodiments of the invention, the HE card manager delegates credential management to a secure element (SE) card manager.

In one or more embodiments of the invention, the HERE (105) is configured to restrict usage of libraries provided by the operating system of the host device (100) by executing applications. Thus, the HERE (105) may identify a subset of the available libraries on the host device (100) and permit usage of this approved subset in order to reduce potential vulnerabilities of the system (199).

In one or more embodiments of the invention, the HERE (105) includes functionality to establish a secure communication session with the SERE (120). The secure communication session may be a secure (e.g., encrypted) connection initiated by either the HERE (105) or the SERE (120) and capable of transmitting data between the HERE (105) and the SERE (120). The secure communication session may use an out-of-band communication protocol and/or any secure channel protocol supported by the HERE (105) and the SERE (120). For example, Global Platform's SCP03 secure channel protocol may be used to establish the secure communication session. The secure communication session may be facilitated by the operating system of the host device (100) and/or may utilize one or more operating system calls, in accordance with one or more embodiments of the invention.

Continuing with the discussion of FIG. 1, the HERE (105) is configured to restart after a failure of the secure communication session in accordance with one or more embodiments of the invention. The SERE (120) may be configured to keep track of the failure and may lock the secure storage element or a portion thereof after a predefined number of failed attempts.

In one or more embodiments of the invention, the HERE (105) is configured to communicate with the SERE (120) using an out-of-band communication protocol. Examples of an out-of-band communication protocol may include any protocol which is different from the generic mass storage interface utilized by the host device (100). One example of an out-of-band communication protocol is application protocol data unit (APDU).

In one or more embodiments of the invention, in a tiered architecture, the secure storage element (115) includes a SERE (120). The SERE (120) may be any process controlling access to the persistent memory image (125), including a runtime environment (i.e., execution environment), a firmware application, a firmware data structure, an operating system, and/or any software code, application, or runtime environment capable of controlling access to the persistent memory image (125).

In one or more embodiments of the invention, the SERE (120) is a software application which, when executed by the host device (100), provides an interface for communication between one or more outside applications (e.g., the HERE (105)) and the persistent memory image (125). Examples of a SERE (120) may include Oracle Corporation's Java™ Runtime Environment (JRE), Oracle Corporation's Java Card™ Runtime Environment (JRE), TrueCrypt Foundation's TrueCrypt application, Sarah Dean's FreeOTFE application, and any management/encryption/authentication application. In one or more embodiments of the invention, the SERE may be implemented as a secure element application which includes one or more functions of the SERE without functionality of a runtime environment.

Continuing with the discussion of FIG. 1, the SERE (120) performs encryption and/or decryption of data stored on the secure storage element (115) (or a segment thereof) in accordance with one or more embodiments of the invention The SERE (120) may be configured to use any method of encryption, including symmetric key (e.g., data encryption standard (DES), advanced encryption standard (AES)) and public key encryption (e.g., RSA encryption).

In one or more embodiments of the invention, in an un-tiered architecture, the secure storage element (115) does not include a SERE (120). In an un-tiered architecture, various other software and/or hardware security mechanisms may be utilized, in accordance with various embodiments of the invention.

In one or more embodiments of the invention, the SERE (120) includes functionality to randomly generate an ephemeral key as a mutual session key for the secure communication session. The mutual session key may be generated when the HERE (105) code is retrieved from the secure storage element (115) for execution on the host device (100). Alternatively, in one or more embodiments of the invention, the secure storage element (115) is configured to generate a sole session key when the HERE (105) code is retrieved from the secure storage element (115) for execution on the host device (100).

In one or more embodiments of the invention, the SERE (120) is configured to:
  insert the session key in the HERE (105) code being retrieved from the secure storage element (115)
  put the session key, for a very short time interval, in a known location on the secure storage element (115)
  retrieve, for a very short time interval, the session key in response to a request to the SERE (120)

In one or more embodiments of the invention, instead of a key, a one time password may be used. The key or password may only be used once in accordance with various embodiments of the invention.

In one or more embodiments of the invention, the SERE (120) is configured to commit changes (e.g., change logs, single item atomic changes on persistent objects) to a session change log within the secure storage element (115). The SERE (120) may then apply the session change log to the persistent memory image (125) upon the next platform reset, at one or more predefined time(s), and/or in response to one or more events. For example, the SERE (120) may be configured to apply the session change log upon detecting that the persistent memory image (125) must be defragmented. In one or more embodiments of the invention, the HERE (105) includes functionality to apply any of the aforementioned changes directly to the secure storage element (115), without the need for a SERE (120) (e.g., in an un-tiered architecture).

Continuing with the discussion of FIG. 1, the SERE (120) is configured to perform one or more periodic maintenance operations on the secure storage element (115) and/or the persistent memory image (125) in accordance with one or more embodiments of the invention. Examples of periodic maintenance operations include defragmentation and garbage collection. The SERE (120) may perform the periodic maintenance operations on an as-needed basis or at one or more predefined times. For example, a maintenance operation may be performed upon platform reset. In one or more embodiments of the invention, the HERE (105) includes functionality to perform one or more periodic maintenance operations on the secure storage element (115) directly, without the need for a SERE (120) (e.g., in an un-tiered architecture).

In one or more embodiments of the invention, the SERE (120) is configured to create a copy of the persistent memory image (125) (or any segment thereof). The SERE (120) may then apply the session change log to the copy of the persistent memory image (125) (or, alternatively, to the original persistent memory image (125)). The SERE (120) may be configured to replace the original persistent memory image (125) with the copy after the session change log is successfully applied. In one or more embodiments of the invention, the session change log and the original (i.e., unaltered) persistent memory image (125) are deleted after applying the session change log to the copy. In one or more embodiments of the invention, the HERE (105) includes functionality to create the copy of the persistent memory image in the secure storage element (115) and to apply change logs to the secure storage element (115) directly, without the need for a SERE (120) (e.g., in an un-tiered architecture).

In one or more embodiments of the invention, a change log is organized as a series of idempotent entries such that changes can be applied multiple times without loss of information. In case of an interruption while applying the change log, this may be more efficient than deleting the entire copy of the persistent memory image (125) and restarting the process.

In one or more embodiments of the invention, rather than creating a copy of the entire persistent memory image (125), the SERE (120) is configured to create copies of one or more changed pages within the persistent memory image (125). Thus, changes from the change log may be applied to the pages individually. In case of an interruption while applying the changes, it may be possible to reapply changes only to the affected pages (rather than the entire persistent memory image (125)).

In one or more embodiments of the invention, the SERE (120) is configured to store check values corresponding sensitive sections of the application in the secure storage element (115). Check values may be used to perform error detection and to identify corrupted or compromised sensitive sections. A check value may be any numeric, alphanumeric, binary, or other value calculated based on a mathematical function of the sensitive section. For example, the SERE (120) may use cyclic redundancy checking (CRC) to generate the check value and to perform the error detection.

In one or more embodiments of the invention, the SERE (120) is configured to compute a check value of a sensitive section and validate it against a previously recorded check value stored within the secure storage element (115). The HERE (105) may submit the sensitive section to the SERE (120) which then performs the validation. Alternatively, the HERE (105) may request the stored check value from the SERE (120) in order to perform the validation. In one example, the HERE (105) executes an application and, during execution, identifies a sensitive object within the application. The HERE (105), upon accessing the object a first time, submits the object to the SERE (120). The SERE (120) calculates a first check value for the object and stores the object in the secure storage element (115). Continuing the example, the HERE (105) identifies a second access to the sensitive object and submits the object again to the SERE (120). The SERE (120) calculates a second check value based on the object and validates the object by confirming that the first check value and the second check value are equal.

Continuing with the discussion of FIG. 1, the SERE (120) is configured to store check values in a private partition of the secure storage element (115) in accordance with one or more embodiments of the invention. The private partition may be used to prevent illegal modifications of the check values and/or may further be segmented into sections for each application executing on the host device (100). In one or more embodiments of the invention, the HERE (105) includes all of the aforementioned functionality to store, compute, and/or validate check values corresponding sensitive sections of the application in the secure storage element (115) directly, without the need for a SERE (120) (e.g., in an un-tiered architecture).

Alternatively, in one or more embodiments of the invention, the SERE (120) is configured to encrypt and store sensitive sections of an application on the secure storage element (115). The SERE (120) may then decrypt the sensitive sections upon request from the HERE (105).

In one or more embodiments of the invention, the SERE (120) includes one or more security features that are compatible with SE-specific sections of an executing application. In one or more embodiments of the invention, SE-specific sections (e.g., sections compatible with one or more security features of the SERE (120)) are encrypted, stored in the secure storage element (115), and/or decrypted by the SERE (120). Thus, when executing an application, the HERE (105) may be configured to delegate access and security of an SE-specific sensitive section to the SERE (120), in accordance with one or more embodiments of the invention.

In one or more embodiments of the invention, the SERE (120) includes functionality to identify SE-specific sections of an application and HERE-specific sections of an application. Both SE-specific sections and HERE-specific sections may be demarcated by developers of the application.

Continuing with the discussion of FIG. 1, the SERE (120) is configured to compute a check value of the HERE (105) and verify the check value against a previously computed check value in accordance with one or more embodiments of the invention. The check value may be stored on the host device (100) or the secure storage element (115) in accordance with various embodiments of the invention. In one or more embodiments of the invention, rather than transmitting and checking the complete code of the HERE (105), a section of the code may be used to compute the check value. The section may be randomly determined by either the HERE (105) or the SERE (120) in accordance with various embodiments of the invention. Thus, in one or more embodiments of the invention, the SERE (120) may request a section of the HERE (105) code from the HERE (105) for verification or may request that the HERE (105) compute a check value for the section for verification. Accordingly, the HERE (105) may be periodically verified.

In one or more embodiments of the invention, the HERE (105) and/or the SERE (120) are configured to generate a comparison of a newly computed check value with a registered check value stored in the secure storage element for a security sensitive section and/or object. Based on the comparison (e.g., the check values being equal), the HERE (105) and/or the SERE (120) may validate the security sensitive section of code for execution. In one or more embodiments of the invention, registered check values are updated periodically or in response to one or more predefined events.

In one or more embodiments of the invention, the SERE (120) is configured to trigger one or more security checks of the HERE (105) code. A security check may include any method of verifying the integrity of the HERE (105), including one or more of the error detection methods disclosed herein. The security checks may be performed at start time, at exit time, on a timely basis and/or upon certain conditions while interacting with the HERE (105). In one or more embodiments of the invention, the SERE (120) is configured to detect a failure of a security check and to lock the persistent memory image (125) and/or end communication with the HERE (105) in response to the failure. In one or more embodiments of the invention, the HERE (105) includes all of the aforementioned functionality to store, compute, and/or validate check values for the HERE (105) and to trigger one or more security checks of the HERE (105) directly, without the need for a SERE (120) (e.g., in an un-tiered architecture).

Continuing with the discussion of FIG. 1, the SERE (120) includes or is operatively connected to an SE card manager in accordance with one or more embodiments of the invention. The SE card manager may include functionality to perform and/or facilitate communication between the SERE (120) and the secure storage element (115). Thus, the SE card manager may be configured to control access to and/or management of the secure storage element (115) in accordance with various embodiments of the invention, as disclosed herein. In one or more embodiments of the invention, SE-specific applications or sections of an application are delegated to the SE card manager for access (i.e., reading and writing) to the secure storage element (115). In one or more embodiments of the invention, the SE card manager performs secure updates to the HERE (105).

In one or more embodiments of the invention, the system (199) utilizes the following, or any variation of the following chain of trust: 1) SERE (120)→2) HERE (105)→3) security countermeasures→4) applications executing on the host device (100). Countermeasures may include any method of ensuring the authenticity and/or integrity of sensitive sections of an application or the HERE (105), the SERE (120), the persistent memory image (125), and/or the persistent memory cache (110), as disclosed herein. In the case of a conflict between any two entities identified by the chain of trust, the system grants overriding privileges to the entity ranked higher in the chain. For example, requests from the SERE (120) are given priority over conflicting requests from the HERE (105).

In one example, the SERE is a Java Card™ 2 Runtime Environment and the HERE (105) is a Java Card™ 3 Connected Runtime Environment. In this example, a developer separates the code of an application into two parts: (1) the HERE-specific code within a ".jar" file and (2) the SE-specific code within a ".cap" file. The application includes the following components:
    the Transit POS web application
    the Transit Admin web application
    the Transit Turnstile extended applet application
    the Wallet Assist Extended applet application
    the Wallet Classic applet application Continuing the example, the Transit POS web application, the Transit Admin web application, the Transit Turnstile extended applet application, and the Wallet Assist Extended applet application are deployed to the HERE (105). The Wallet Classic applet application and the required remote proxies' counterparts (skeletons) will be deployed to the SERE (120).

Figure 2:
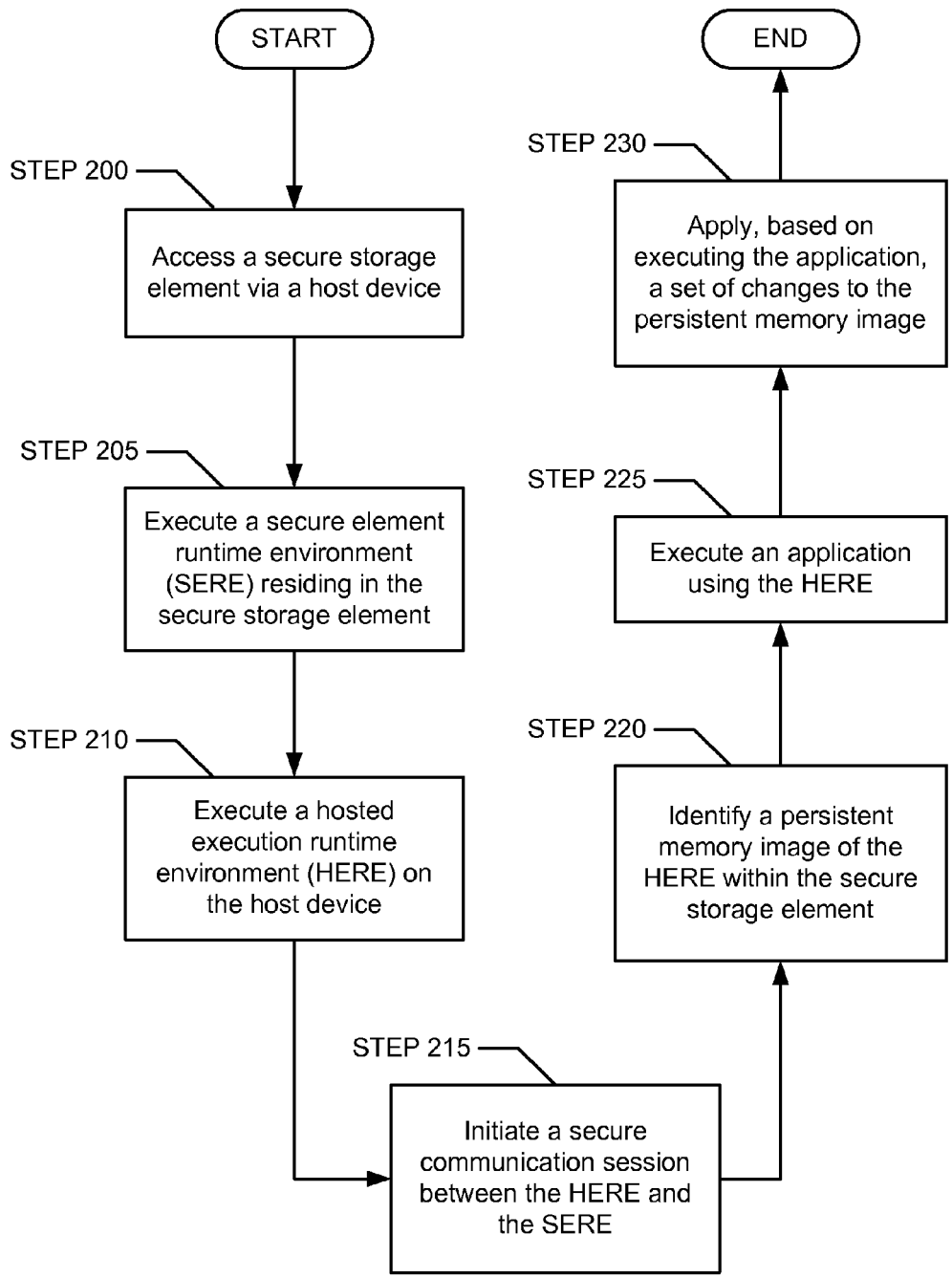
FIGS. 2 and 3 show flowcharts in accordance with one or more embodiments of the invention.

FIG. 2 shows a flowchart of a method for executing a hosted execution runtime environment (HERE) on a host device. The host device is connected to a secure storage element having a persistent memory image of the HERE. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, a secure storage element is accessed via a host device, in one or more embodiments of the invention. The secure storage element may be operatively connected to the host device. Accessing the secure storage element may involve any method of authenticating a user of the host device for access to the secure storage element. The secure storage element may be configured to obtain a password, key, and/or authorization from the user in order to provide access. Examples of an authorization may include a biometric authorization by the secure storage element.

In STEP 205, a secure element runtime environment (SERE) residing in the secure storage element is executed, in one or more embodiments of the invention. The SERE may be executed as part of a startup or connection routine upon connecting the secure storage element to the host device. Alternatively, the SERE may be executed in response to authorizing a user of the host device and/or in response to any predefined trigger or event.

In STEP 210, a hosted execution runtime environment (HERE) is executed on the host device, in one or more embodiments of the invention. In one or more embodiments of the invention, the HERE code is securely retrieved from the secure storage element. The HERE code may be retrieved by the SERE in response to a request from the host device.

In a tiered architecture, the SERE may initiate or request execution of the HERE, in accordance with various embodiments of the invention. Alternatively, in one or more embodiments of the invention, the HERE may be executed in response to any predefined event or trigger, after obtaining access to the secure storage element.

In STEP 215, a secure communication session is initiated between the HERE and the SERE, in one or more embodiments of the invention. The secure communication session may utilize an out-of-band communication protocol or any predefined communication protocol. The secure communication session may facilitate the transfer of data between the HERE and the SERE and may provide encryption, integrity checking, and/or other security mechanisms in accordance with various embodiments of the invention.

In STEP 220, the persistent memory image of the HERE is identified within the secure storage element, in one or more embodiments of the invention. The persistent memory image may be an EEPROM image or any other type of secure image of the HERE code stored on the secure storage element. The SERE may identify and/or validate the integrity of the persistent memory image at any predefined time or in response to any predefined event. For example, the SERE may perform any number of security and/or startup routines involving identifying the persistent memory image upon startup of the host device.

In STEP 225, an application is executed using the HERE. In one or more embodiments of the invention, in a tiered architecture, the HERE initiates execution of the application and delegates SE-specific sections of the application to the SERE for execution. In one or more embodiments of the invention, the HERE executes HERE-specific sections of the application and may utilize the secure storage element for sensitive sections of the application (in a tiered or un-tiered architecture). Security sensitive sections of the application may be delegated to the SERE and/or stored and retrieved from the secure storage element in accordance with various embodiments of the invention.

In STEP 230, a set of changes are applied to the persistent memory image based on executing the application. In one or more embodiments of the invention, the set of changes is stored in a change log and applied to the persistent memory image at a predefined time or in response to a predefined event (e.g., startup/shutdown of the host device). In one or more embodiments of the invention, the changes may be written to a session change log residing on the secure storage element and then applied to the persistent memory image at a later time. For example, transaction change logs and single item atomic changes may be written to the session change log immediately. Continuing the example, the SERE then creates a copy of the persistent memory image and applies all changes to the copy. Upon successful application of the session change log to the copy, the SERE replaces the persistent memory image with the copy.

Figure 3:
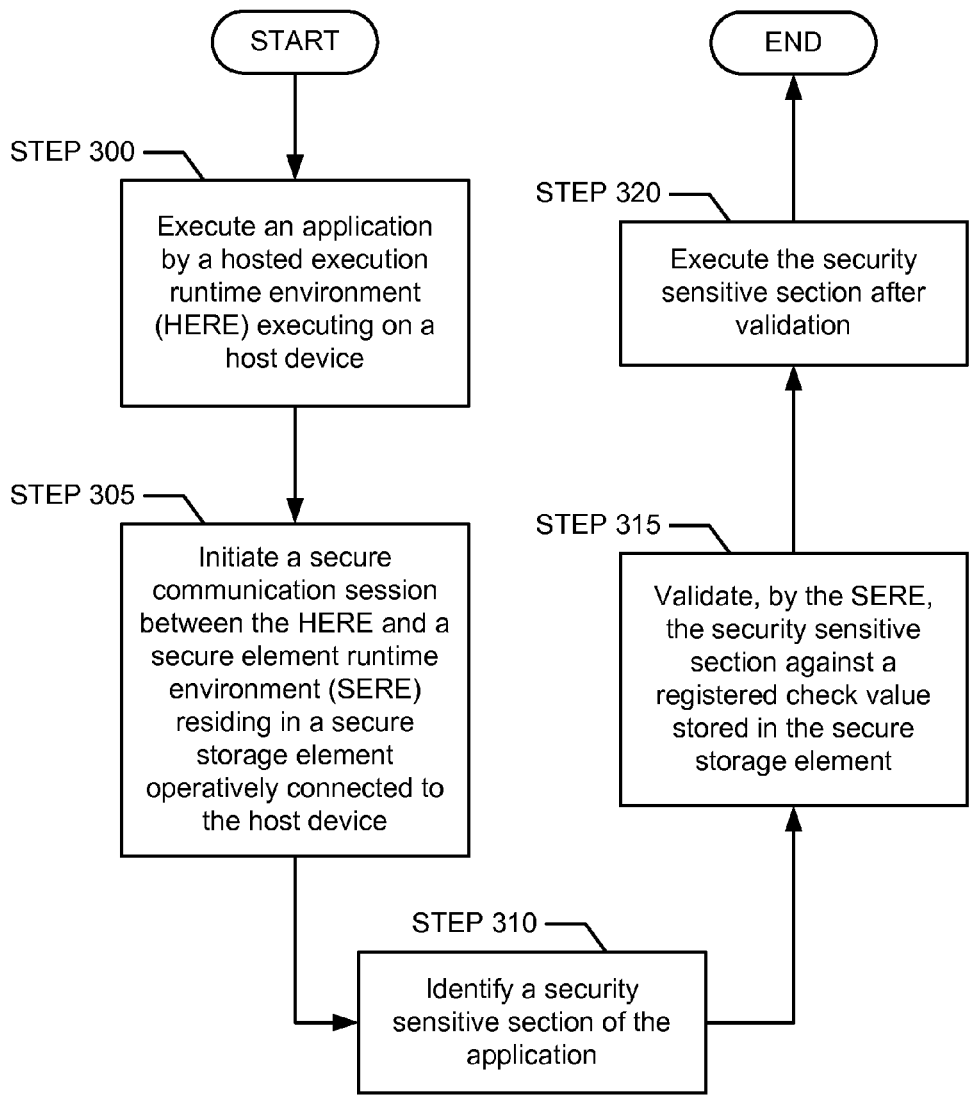

FIG. 3 shows a flowchart of a method for executing a security sensitive section of an application by a secure element runtime environment (SERE) residing on a secure storage element. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, an application is executed by a hosted execution runtime environment (HERE) executing on a host device. The application may include one or more demarcated or recognizable security sensitive sections of code which are compatible with one or more security features of a SERE residing on a secure storage element.

In STEP 305, a secure communication session is initiated between the HERE and a SERE residing in a secure storage element operatively connected to the host device. The secure communication session may be initiated by the HERE or the SERE, and may follow any one of various communication protocols, in one or more embodiments of the invention.

In STEP 310, a security sensitive section of the application is identified. The security sensitive section may be demarcated in a programming language in which the application was written and/or may be one or more predefined security sensitive statements recognized by the HERE. The HERE may identify the security sensitive section during execution of the application by scanning program instructions of the application prior to executing them.

In STEP 315, the security sensitive section is validated, by the SERE, against a registered check value stored in the secure storage element. In order to validate the security sensitive section, a registered check value must exist within the secure storage element for the security sensitive section. Thus, the HERE may compute a check value for the security sensitive section and transmit the check value over the secure communication session to the SERE. Upon receiving the check value, the SERE may compare the check value with the registered check value. If the two values are equal the SERE may validate the security sensitive section by transmitting a validation message, over the secure communication session, to the HERE.

In one or more embodiments of the invention, if a registered check value does not yet exist within the secure storage element for the security sensitive section, a new registered check value is computed and stored. First, the HERE may compute a new check value for the security sensitive section and transmit the check value to the SERE over the secure communication session. Next, the SERE may register and store the new check value in the secure storage element and send a message back to the HERE confirming registration. In one or more embodiments of the invention, the new check value is registered upon exiting the security sensitive section during execution of the application.

In one or more embodiments of the invention, in a tiered architecture, the check values may be computed by the SERE and/or may be computed based on a subsection of the security sensitive section which is transmitted to the SERE over the secure communication session. In this way, subsequent validation of the security sensitive section and/or security sensitive objects accessed by the security sensitive section may be performed against the newly registered check value.

In STEP 320, the security sensitive section is executed after validation. Execution of the security sensitive section may be performed by the SERE or the HERE, in accordance with various embodiments of the invention. If the security sensitive section includes any SE-specific code, the SERE may be used to execute such code. Conversely, HERE-specific code may be executed by the HERE.

In one example, a user of a mobile device inserts a subscriber identification module (SIM) card into the mobile device. Upon power-on, the mobile device executes a Java Card™ 2 Runtime Environment (JC2RE) residing on the SIM card. At this point, until a password is obtained from the user, the SIM card is locked and inaccessible from applications executing on the mobile device.

Continuing the example, the host device then prompts the user for a password in order to unlock the SIM card. Upon unlocking the SIM card, the JC2RE on the SIM card generates a password or a separate one-time key value and stores it within the code (on the SIM card) of an HERE for execution. The host device then retrieves from the SIM card the code of the HERE for execution. In this example, after startup, the on host (executing) HERE then retrieves from its own code the one-time key value (with limited usability time) and uses it to negotiate a session key with the JC2RE to enable a secure communication session between the HERE and the JC2RE.

Continuing the example, the HERE requests a copy of an encrypted EEPROM image of the HERE residing in the SIM card. The encrypted EEPROM image is transmitted, over the secure communication session, from the JC2RE to the HERE executing on the mobile device. The encrypted EEPROM image is cached in the RAM of the mobile device and a platform reset is performed.

Continuing the example, after the platform reset, the secure communication session is re-established and a set of applications are executed by the HERE on the host device. During execution of the applications, decryption and encryption of the cache are performed by the HERE. The HERE also performs the following tasks:

a. it delegates calls to cryptographic API, Java Card 2-compatible objects to the JC2RE
  b. when entering a sensitive section (security-annotated object or method), it transmits the section to JC2RE for checking against a registered CRC/Digest check value
  c. when exiting a sensitive section (security-annotated object or method), it transmits the section to JC2RE for CRC/Digest check value registration
  d. when performing a single item atomic update or committing a transaction on a persistent object it transmits the corresponding change log to the JC2RE
  e. at pre-determined security check points or upon JC2RE request, it may transmit predetermined or randomly determined sections of the HERE code or application code for error checking against the EEPROM image or a stored check value on the SIM card Continuing the example, before exiting, the HERE sends the cache of the EEPROM image (or a set of changes to the cache) over the secure communication session to the JC2RE. The JC2RE then checks all sensitive sections of the cached EEPROM image and encrypts and stores the cached EEPROM image on the SIM card (or applies the changes to the existing EEPROM image). If upon the next startup of the mobile device, the EEPROM image is marked out of sync, the SIM card is blocked.

Figure 4:
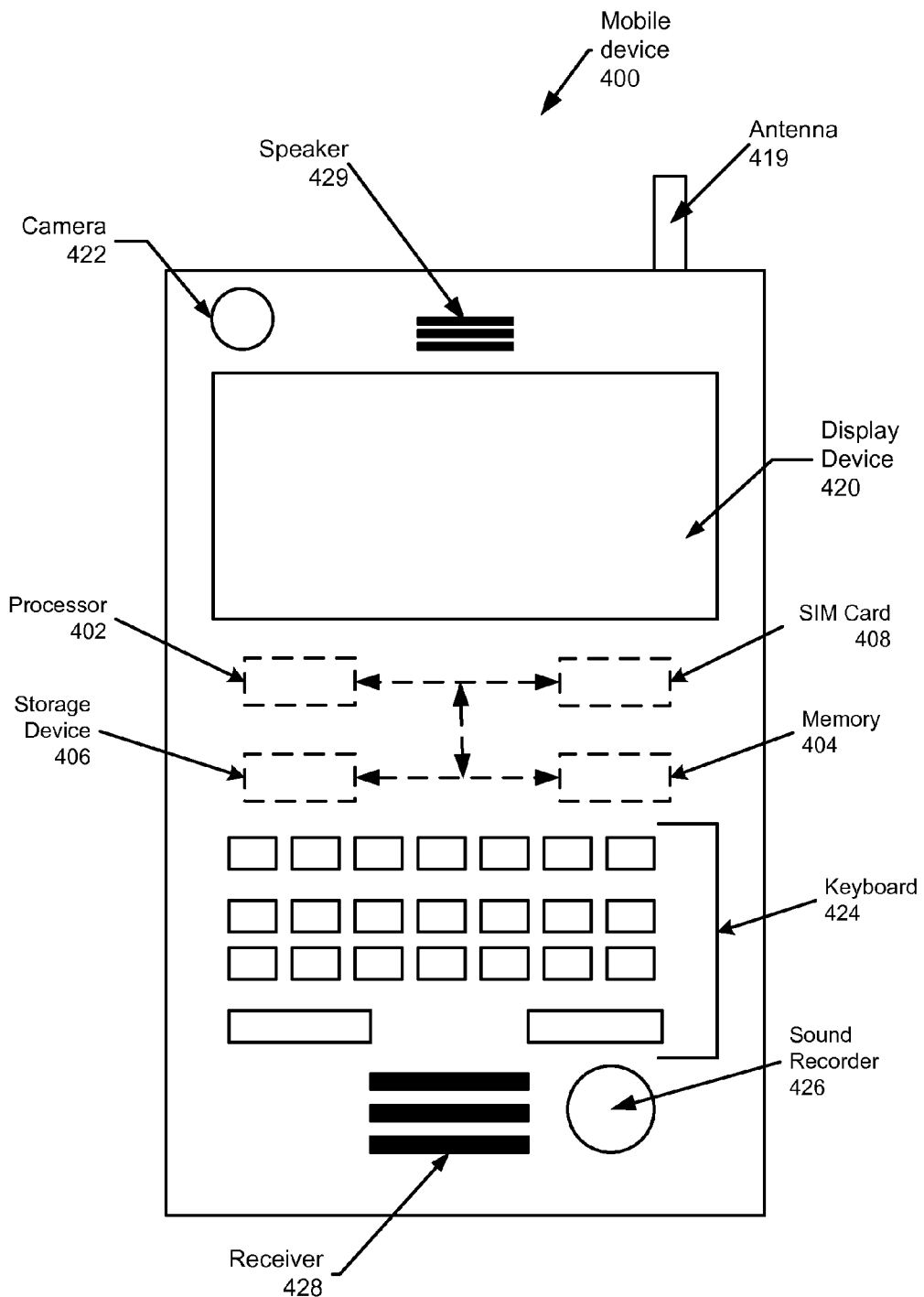
FIG. 4 shows a mobile device in accordance with one or more embodiments of the invention.

Embodiments of the invention may be implemented on virtually any type of mobile device regardless of the platform being used. In one or more embodiments of the invention, the mobile device (400) includes any portable device that provides a user interface. Examples of mobile devices may include, but are not limited to, cellular phones, personal digital assistants, personal communicators, pagers, smart phones, or any other computing device. For example, as shown in FIG. 4, a mobile device (400) includes a processor (402), memory (404), a storage device (406), a subscriber identification module (SIM) card (408), a speaker (429), a receiver (428), a keyboard (424), a sound recorder (426), a display device (420), a camera (422), and an antenna (419).

The mobile device (400) includes one or more processor(s) (402) (such as a central processing unit (CPU), integrated circuit, hardware processor, etc.), associated memory (404) (e.g., RAM, cache memory, flash memory, etc.), a storage device (406) (e.g., a hard disk, an optical drive such as a compact disk drive or digital video disk (DVD) drive, a flash memory stick, etc.), a SIM card (408), and numerous other elements and functionalities typical of today's mobile devices (not shown). The mobile device (400) may include input means and output means, such as the keyboard (424), the receiver (428), and/or the display device (e.g., a liquid crystal display screen) (420), which permits a user to enter and/or display keystrokes including numeric, alphabetic, and other characters, images, or other media types. Other input devices may include a camera (422), a sound recorder (426), and/or other data recording mechanism. Those skilled in the art will appreciate that these input and output means may take other forms now known or later developed. Using embodiments of the present invention, a consumer may initiate an electronic funds transfer using the mobile device (400).

The mobile device (400) may be connected to a network (e.g., a local area network (LAN), a wide area network (WAN) such as the Internet, or any other similar type of network) via the antenna (419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (400) with a mobile device identifier of the mobile device (400).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 5:
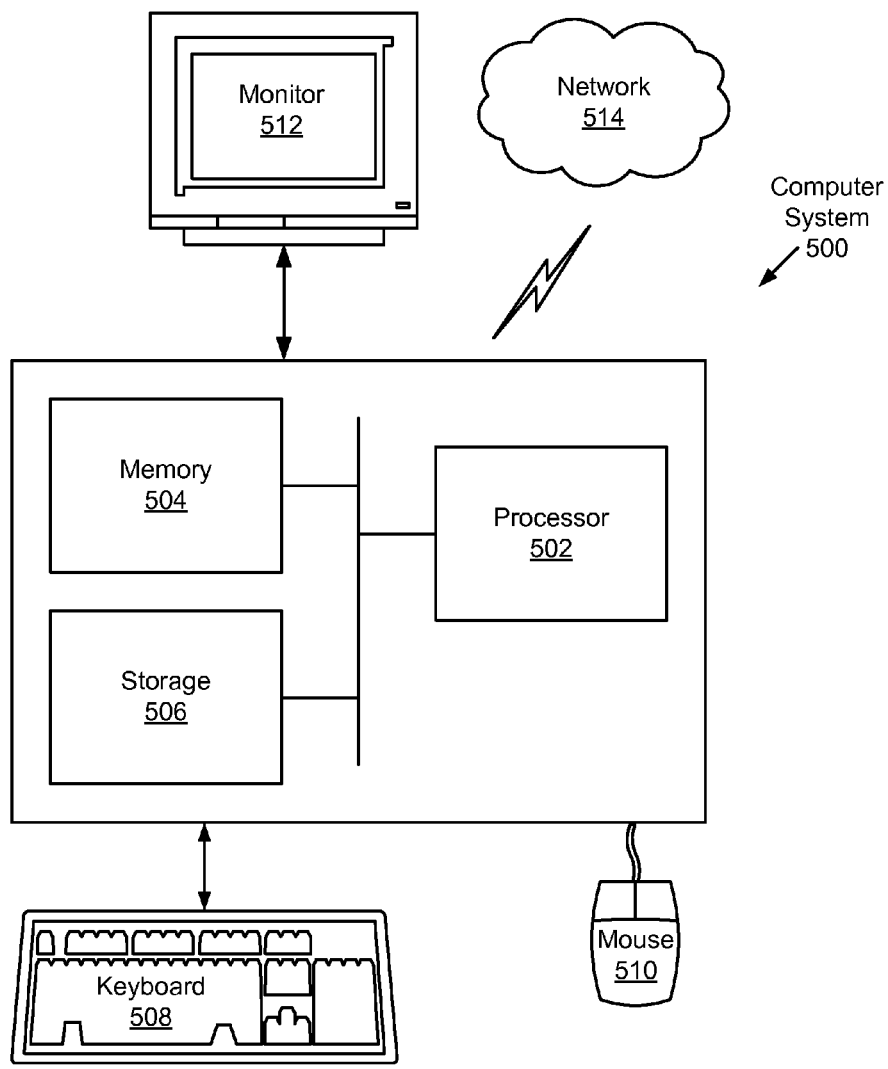
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., secure storage element (115), host device (100), hosted execution runtime environment (105), persistent memory image (125), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By executing a hosted execution runtime environment on a non-secure host device connected to a secure storage element, it may be possible to utilize one or more security features of the secure storage element or a SERE residing in the secure storage element. Thus, a larger selection of host devices may be available to designers, with the added security provided by the secure storage element.

Furthermore, by executing security sensitive sections of host applications using a SERE residing on the secure storage element, one or more SE-specific security features may be utilized. Thus, the processing power of the non-secure host device may be utilized without compromising the one or more SE-specific security features of the SERE.

Furthermore, by maintaining changes to a persistent memory cache within a session change log and applying the changes to the persistent memory image at a predefined time (e.g., upon platform reset), the system may reduce the possibility an interruption occurring during the application of changes and corrupting the persistent memory image.

Furthermore, recording transaction change logs and single item atomic changes within a session change log instead of applying them immediately may reduce the number of accesses to the persistent memory image and may improve performance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for securely executing an application on a host device applications, comprising:
   accessing, by the host device, a smart card comprising a secure storage element;
   executing, by a computer processor of the host device, a hosted execution runtime environment (HERE) on the host device;
   executing, by the smart card, a secure element runtime environment (SERE) residing in the secure storage element which is configured to authenticate a user of the host device for access the secure storage element;
   initiating, by the HERE, a secure communication session between the HERE and the SERE; identifying a persistent memory image of the HERE, comprising the application, within the secure storage element;
   verifying, using the persistent memory image, that the HERE is secure;
   executing, after verifying that the HERE is secure, and by the computer processor, the application within the HERE; and
   applying, by the SERE and based on executing the application, a first plurality of changes to the persistent memory image.

2. The method of claim 1, further comprising:
   obtaining, by the HERE and over the secure communication session, the persistent memory image from the secure storage element; and
   creating a cache of the persistent memory image in the host device prior to executing the application, wherein the first plurality of changes are made to the cache during execution of the application.

3. The method of claim 2, wherein applying the first plurality of changes to the persistent memory image comprises:
   maintaining a change log corresponding to the cache;
   storing, during execution of the application, the first plurality of changes to the cache in the change log;
   transmitting, over the secure communication session and after executing the application, the change log to the SERE; and
   applying, by the SERE, the first plurality of changes to the persistent memory image.

4. The method of claim 2, further comprising:
   re-executing the application after applying the first plurality of changes to the persistent memory image;
   storing, while re-executing the application, a second plurality of changes to the cache in a session change log residing in the secure storage element, wherein the second plurality of changes is stored as a series of idempotent entries in the session change log;
   creating a copy of the persistent memory image in the secure storage element;
   initiating a process to apply the second plurality of changes to the copy of the persistent memory image;
   detecting an interruption of the process; and
   reapplying, in response to detecting the interruption, the second plurality of changes to the copy of the persistent memory image.

5. The method of claim 2, further comprising:
   re-executing the application after applying the first plurality of changes to the persistent memory image;
   storing, while re-executing the application, a second plurality of changes to the cache in a session change log residing in the secure storage element;
   creating a copy of a plurality of pages of the persistent memory image in the secure storage element;
   applying the second plurality of changes to the copy of the plurality of pages; and
   deleting, after applying the second plurality of changes, the session change log and the copy of the plurality of pages.

6. The method of claim 5, wherein the security sensitive section comprises a cryptographic computation.

7. The method of 1, wherein executing the application further comprises:
   identifying a security sensitive section of the application;
   computing a check value for the security sensitive section;
   generating a comparison of the check value with a registered check value stored in the secure storage element, wherein the check value and the registered check value are equal;
   validating, by the SERE, the security sensitive section based on the comparison; and
   executing the security sensitive section after validating the security sensitive section.

8. The method of claim 1, further comprising:
   designating a section of the persistent memory image for the application, wherein the
   first plurality of changes are applied to the designated section.

9. The method of claim 1, wherein the first plurality of changes comprises a single item atomic change to a persistent object, and wherein the first plurality of changes are stored in a session change log residing in the secure storage element.

10. The method of claim 1, wherein accessing the secure storage element comprises:
    obtaining, from a user of the host device, a security credential; and
    authenticating the user based on the security credential.

11. The method of claim 1, wherein the SERE and HERE are versions of a Java 22 Card platform, and wherein the HERE is a later version of the Java Card platform than the SERE.

12. A system for securely executing an application, comprising:
    a host device comprising a computer processor;
    a smart card, comprising a secure storage element and operatively connected to the host device, wherein the secure storage element is configured to authenticate a user of the host device for access to the secure storage element; and
    a hosted execution runtime environment (HERE) executing on the computer processor and configured to:
      initiate a secure communication session between the HERE and a secure element runtime environment (SERE), residing in the secure storage element;
      identify a persistent memory image of the HERE, comprising the application, within the secure storage element;
    execute an application, wherein the SERE is further configured to apply the first plurality of changes to the persistent memory image.

13. The system of claim 12, wherein the HERE is further configured to:
    obtain, over the secure communication session, the persistent memory image from the secure storage element; and
    create a cache of the persistent memory image in the host device prior to executing the application, wherein the first plurality of changes is made to the cache during execution of the application.

14. The system of claim 12, wherein the HERE is further configured to:
    maintain a change log corresponding to the cache;

store, during execution of the application, the first plurality of changes to the cache in the change log; and transmit, over the secure communication session and after executing the application, the change log to the SERE, wherein the first plurality of changes is applied to the persistent memory image by the SERE.

15. The system of claim 12, wherein the HERE is further configured to re-execute the application, and wherein the SERE is further configured to:

store, while the application is re-executed, a second plurality of changes to the cache in a session change log residing in the secure storage element;

create a copy of the persistent memory image in the secure storage element;

initiate a process to apply the second plurality of changes to the copy of the persistent memory image;

detect an interruption of the process; and delete, in response to detecting the interruption, the copy of the persistent memory image.

16. The system of claim 12, wherein the HERE is further configured to re-execute the application, and wherein the SERE is further configured to:

store, while the application is re-executed, a second plurality of changes to the cache in a session change log residing in the secure storage element;

create a copy of the persistent memory image in the secure storage element;

apply the second plurality of changes to the copy of the persistent memory image; and delete, after the second plurality of changes are applied to the copy of the persistent memory image, the session change log and the copy of the persistent memory image.

17. The system of claim 12, wherein executing the application further comprises:

identifying a security sensitive section of the application;

computing a check value for the security sensitive section;

generating a comparison of the check value with a registered check value stored in the secure storage element, wherein the check value and the registered check value are equal;

validating, by the SERE, the security sensitive section based on the comparison; and executing the security sensitive section after validating the security sensitive section.

18. The system of claim 12, wherein the SERE and HERE are versions of a Java 22 Card platform, and wherein the HERE is a later version of the Java Card platform than the SERE.

19. A non-transitory computer-readable storage medium storing a plurality of instructions for securely executing an application, the plurality of instructions comprising functionality to:

access a smart card, comprising a secure storage element via a host device;

execute a hosted execution runtime environment (HERE) on the host device;

execute, by the smart card, a secure element runtime environment (SERE) residing in the secure storage element which is configured to authenticate a user of the host device for access the secure storage element;

initiate, by the HERE, a secure communication session between the HERE and the SERE;

identify a persistent memory image of the HERE, comprising the application, within the secure storage element;

verify, using the persistent memory image, that the HERE is secure;

execute the application within the HERE; and apply, by the SERE and based on executing the application, a first plurality of changes to the persistent memory image.

20. The non-transitory computer readable medium of claim 19, wherein the SERE and HERE are versions of a Java 22 Card platform, and wherein the HERE is a later version of the Java Card platform than the SERE.

* * * * *

UNITED STATES PATENT AND TRADEMARK OFFICE
CERTIFICATE OF CORRECTION

| | | |
|---|---|---|
| PATENT NO. | : 8,543,841 B2 | Page 1 of 1 |
| APPLICATION NO. | : 13/174508 | |
| DATED | : September 24, 2013 | |
| INVENTOR(S) | : Violleau et al. | |

It is certified that error appears in the above-identified patent and that said Letters Patent is hereby corrected as shown below:

In the Claims

In column 18, line 7, in Claim 7, delete "of" and insert -- of claim --, therefor.

Signed and Sealed this
Eighteenth Day of March, 2014

Michelle K. Lee
*Deputy Director of the United States Patent and Trademark Office*